United States Patent [19]
Miller

[11] Patent Number: 5,638,299
[45] Date of Patent: Jun. 10, 1997

[54] LIGHT WEIGHT, SELF-CONTAINED PROGRAMMABLE DATA-ACQUISITION SYSTEM

[76] Inventor: Keith Miller, 3490 Poppy St., Long Beach, Calif. 90805

[21] Appl. No.: 493,794

[22] Filed: Jun. 22, 1995

[51] Int. Cl.[6] .................................................. G06F 17/40
[52] U.S. Cl. ............... 364/550; 340/825.06; 340/870.16; 364/551.01; 395/653
[58] Field of Search ............ 340/825.06, 870.16, 340/870.28; 364/550, 551.01; 395/653

[56] References Cited

U.S. PATENT DOCUMENTS

| | | | |
|---|---|---|---|
| 4,234,926 | 11/1980 | Wallace et al. | 364/551.01 |
| 4,258,421 | 3/1981 | Juhasz et al. | 340/870.16 X |
| 4,400,783 | 8/1983 | Locke, Jr. et al. | 364/550 X |
| 4,466,074 | 8/1984 | Jindrick et al. | 364/569 |
| 4,653,034 | 3/1987 | Hoover et al. | 367/131 |
| 4,745,564 | 5/1988 | Tennes et al. | 364/550 X |
| 4,974,181 | 11/1990 | Sinderson et al. | 364/550 |
| 5,056,056 | 10/1991 | Austin | 364/900 |
| 5,133,055 | 7/1992 | Lieberman et al. | 395/275 |
| 5,220,522 | 6/1993 | Wilson et al. | 364/709 |
| 5,299,141 | 3/1994 | Hungerford et al. | 364/510 |
| 5,381,136 | 1/1995 | Powers et al. | 340/539 |
| 5,386,360 | 1/1995 | Wilson et al. | 364/146 |
| 5,400,246 | 3/1995 | Wilson et al. | 340/825.06 X |
| 5,424,720 | 6/1995 | Kirkpatrick | 340/585 |
| 5,432,941 | 7/1995 | Crick et al. | 395/653 |
| 5,444,642 | 8/1995 | Montgomery et al. | 364/550 |
| 5,497,490 | 3/1996 | Harada et al. | 395/653 |
| 5,500,806 | 3/1996 | Bellin et al. | 364/551.01 X |
| 5,586,056 | 12/1996 | Watanabe | 364/550 |

*Primary Examiner*—Edward R. Cosimano

[57] ABSTRACT

A self-contained, light-weight, programmable data-acquisition system is constructed largely from readily available personal computer (PC) subassemblies. It operates as a paperless recorder and event recorder, storing data from a plurality of analog inputs to a fixed disk for later retrieval by a PC. It also operates as a PC peripheral device permitting real-time viewing and analysis, as well as recording, of a plurality of analog inputs. As an event recorder it can store a fixed amount of data preceding the triggering event, which can be in the form of either a contact closure or the value of an analog input exceeding a preset minimum or maximum value. Configuration is performed at the PC and subsequently downloaded to the recorder where it is stored in non-volatile memory. Converted and recorded data display at the host PC is both graphical and numerical form. Channel data displayed at the host PC is uniquely identified in that each channel's data is uniquely colored.

2 Claims, 7 Drawing Sheets

LIGHT WEIGHT, SELF-CONTAINED PROGRAMMABLE DATA-ACQUISITION SYSTEM

BACKGROUND OF THE INVENTION

This invention relates to data-acquisition systems, specifically to such data-acquisition systems which are suited for use in industry for temporary connection to aid in diagnosing intermittent process and equipment anomalies.

BACKGROUND DESCRIPTION OF PRIOR ART

The ability to monitor, record and analyze process and equipment behavior is frequently necessary in many process, manufacturing, research, and utility applications. Permanent and portable recorders for retaining data from various sensors have been used for many years. These include strip-chart recorders, paperless data loggers, plug-in cards for personal computers (PCs), and port attachments to PCs. Strip-chart recorders are generally bulky and heavy, not intended for portable use, consume paper and pen, provide monochrome recording making overlapping signals indistinguishable, require thorough familiarity with their unique configuration and operating procedure, and are constructed from proprietary circuitry and mechanism making purchase cost and the cost of replacement parts relatively high. Paperless data loggers have relatively low sample rates, limited and costly solid state memory, a diminutive monochrome display screen, which provides little resolution of the recorded data and is unable to distinguish overlapping signals, and are constructed from proprietary circuitry making purchase cost and the cost of replacement parts relatively high. Plug-in cards for PCs require the user disassemble and reassemble the PC in order to install the card, then purchase and generally modify third-party software to obtain satisfactory performance from the PC/card combination. The result is a PC with a plug-in data-acquisition card which is heavy and bulky, fragile and not intended for portable industrial use. Port attachments to PCs generally require the user obtain and modify third-party software to obtain satisfactory performance from this combination. Again the user is faced with carrying a heavy, fragile PC out to the job site, and finding a secure location for it. Another disadvantage common to various embodiments of the above stated methodologies is the lack of programmable channel gains. This deficiency requires that the user manually adjust individual signal conditioner zeros and spans to the zero and span of the A/D converter by applying a known signal to each signal conditioner input and reading the value of these conditioned inputs with a voltmeter at some internal test point or on an output connector. Each time a given channel's zero or span needs modification, to correspond to the input signal, this calibration procedure must be carried out, which is time consuming and requires additional specialized test equipment.

OBJECTS AND ADVANTAGES

There is a need, therefore, for a light-weight, portable, programmable, self-contained, multi-functional data-acquisition system which is easy to use, clearly identifies each displayed analog input, and is constructed from readily available, relatively inexpensive subassemblies. Accordingly, it is an object of this invention to provide a light-weight, portable, programmable, self-contained multi-functional data-acquisition system which is easy to use, clearly identifies each displayed analog input, and is constructed from readily available, relatively inexpensive subassemblies.

In particular, it is an object of this invention to provide such a data-acquisition system constructed from:

A) An IBM PC/AT (IBM and PC/AT are registered trademarks of International Business Machines Corporation) compatible (hereafter referred to as compatible) motherboard in which the supplied read-only-memory (ROM) firmware has been removed and replaced with the ROM firmware of the present invention, converting the PC motherbard to an embedded controller;

B) A compatible IDE (integrated drive electronics) fixed disk;

C) A compatible IDE interface and serial port card;

D) A triple-output (+5VDC, +12VDC, −12VDC) power supply;

E) A compatible data converter, and;

F) An enclosure to house the above components and the many jacks and switches forming a part of this invention.

The use of compatible components has the advantages of lower development, manufacturing and replacement costs, ready and continuing component availability for both manufacturer and servicer, and other benefits of this rapidly growing technology, such as decreasing size and price, increasing performance and capacity.

It is a further object of this invention to provide such a data-acquisition system which can be fully configured from a host PC running the supplied software, and which downloads recorded data to the host PC for viewing, analysis, printing, or PC disk storage for later review and analysis.

It is a further object of this invention that the data displayed on the host PC display console be displayed both graphically and numerically, and that the numeric and graphic data of each analog input have a unique color to facilitate its identification.

It is a further object of this invention to provide such a data-acquisition system, which can be configured as a paperless recorder, an event recorder, and as a peripheral attachment to a PC permitting real-time data-acquisition, display and analysis.

The advantages of configuration, data viewing and analysis from a host PC are:

A) Ease of use—any potential user of this invention has access to, and is familiar with, PCs;

B) Lower unit cost, smaller size, less weight—no need for a display to view data, or a keyboard to configure this unit;

C) High-resolution color display for data viewing and analysis—no possibility of confusing signals since each is uniquely colored.

Other objects and advantages of the invention will be apparent from the following description, the accompanying drawings and the appended claims.

DRAWINGS FIGURES

DESCRIPTION OF THE PREFERRED EMBODIMENT

Figure 1:
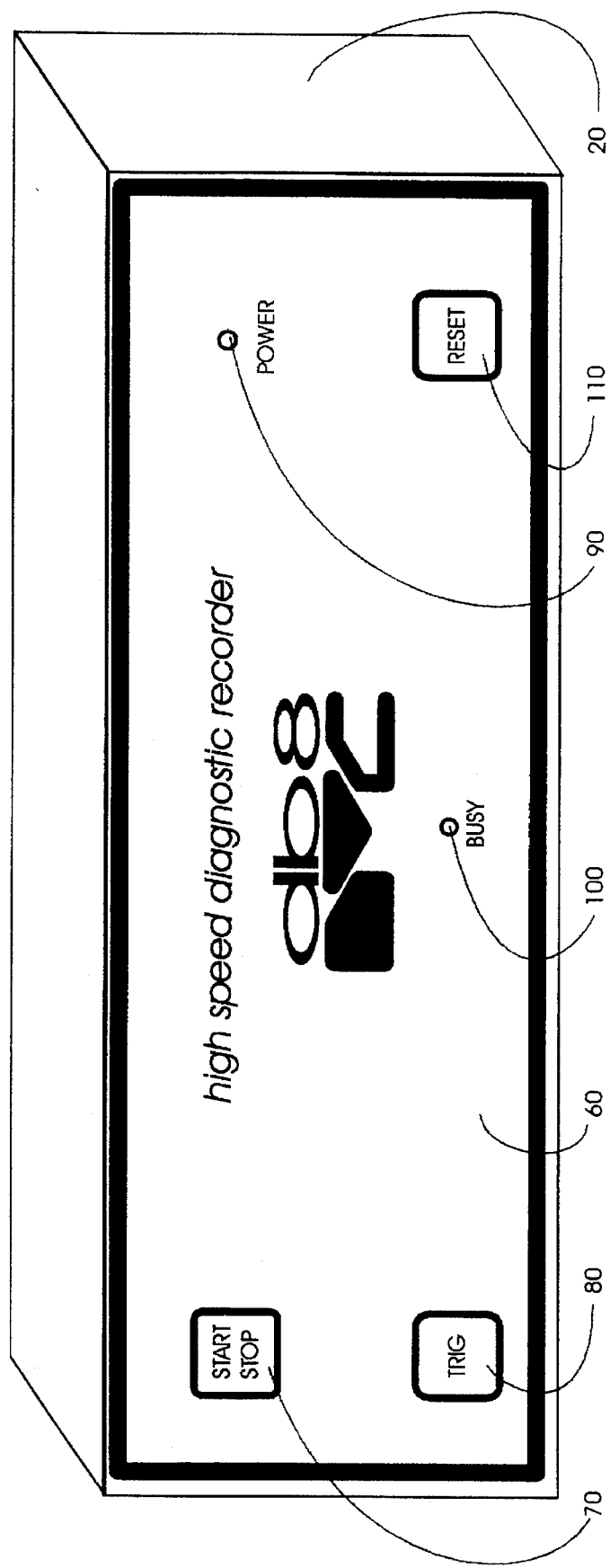
FIG. 1 is a front perspective view of one embodiment of a data-acquisition system constructed according to this invention.

Referring now to FIG. 1, a DATALOGGER db8 (hereafter referred to as db8) data-acquisition system includes a case 20 for housing the components comprising this invention, feet (not shown) upon which the case rests, a shoulder strap (not shown) attached to case 20 for ease of transporting the present invention, a front panel 60 on which are mounted start/stop switch 70, trigger switch 80, power LED 90, busy LED 100, and reset switch 110, a pouch with sealable flap (not shown) attached to the shoulder strap for storage of the provided power cord, communications cable, and test leads (none of which is shown).

A rear panel (not shown) includes a power switch, a power inlet connector, eighteen banana jacks, sixteen of which are for the eight analog inputs, two of which are for the external trigger, and serial port connector (none of which is shown).

Figure 2:
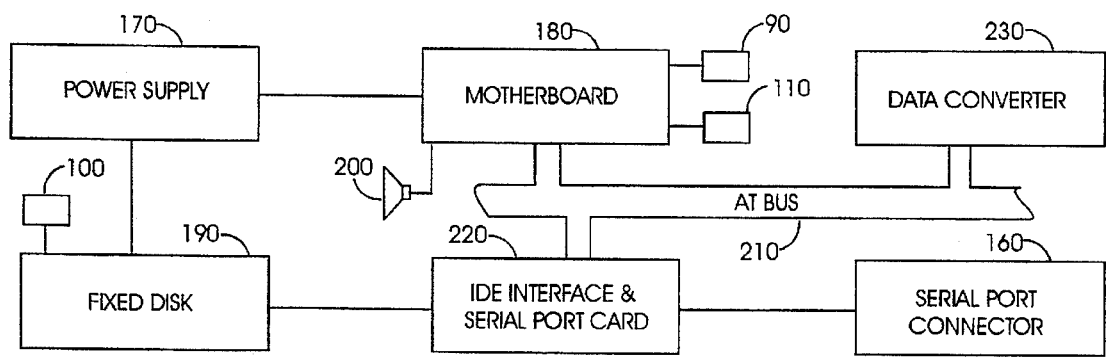
FIG. 2 is an electrical block diagram showing the major components of the invention.
Figure 3:
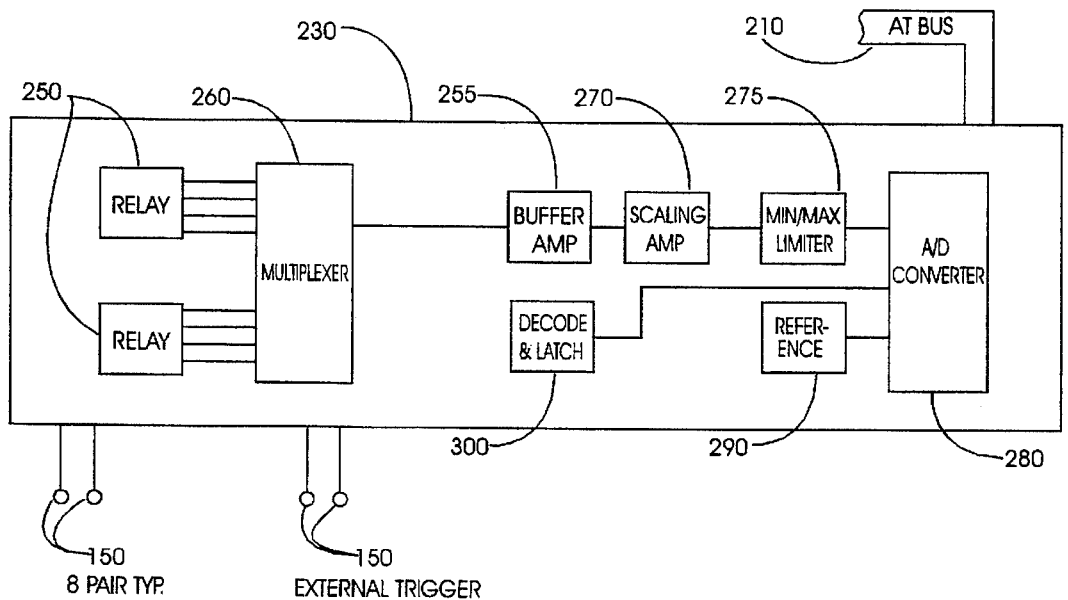
FIG. 3 is an electrical block diagram showing the major components of the data converter used in this invention.

The electronic components of the invention are illustrated in the block diagrams of FIGS. 2 and 3 in which FIG. 2 is a generalized block diagram of the invention.

In the present invention power supply 170 supplies power to motherboard 180 and fixed disk 190 via cabling. Speaker 200, power LED 90, and reset switch 110 are attached to motherboard 180 via cabling. AT bus 210 is in the form of several card edge connectors permanently mounted to and included as part of motherboard 180. IDE interface/serial port card 220 and data converter card 230 have card edges designed to plug into edge connectors on motherboard 180 and are connected thus. Serial port connector 160 is connected to IDE interface/serial port card 220 via cabling. Fixed disk 190 is connected to IDE interface/serial port card 220 via cabling. Disk busy LED 100 is connected to fixed disk 190 via cabling. Included on motherboard 180 is dynamic random-access-memory (RAM), battery-backed memory (CMOS), a real-time clock (RTC), programmable interrupt controllers (PICs), and programmable interval timers (PITs), (none of which is shown).

Operation and configuration of the motherboard, serial port and fixed disk is well known in the art and will not be described here. It is understood configuration of the motherboard, serial port and fixed disk is done according to standard convention, and in such a manner as to support the several modes of operation of the present invention as described in the flowchart of FIGS. 5 and the discussions which follow.

Referring now to FIG. 3 as many as eight analog input signals from banana jacks 150 pass through reed relays 250, which are open when deenergized to protect the electronics of data converter card 230 from damage when power is not supplied it. Under firmware control, analog input signals are sequentially presented to buffer amplifier 255 by channel selection circuitry 260. Buffer amplifier 255 provides a high-impedance load for the analog input signal sources so as not to affect the process or equipment being monitored. The analog input signal of interest is next presented to scaling circuitry 270. Under firmware control, the analog input signal is scaled to the range of analog-to-digital (A/D) converter 280 for maximum resolution Of the recorded analog signal. The scaled analog input passes through min/max limiter 275 and then onto A/D converter 280, where it is converted to a plural-bit binary word for transfer to the motherboard via AT bus 210. In the preferred embodiment the binary word length of converted data is eight bits. Reference inputs 290 are required to provide zero and full-scale voltages to A/D converter 280. Data transfer enabling circuitry 300 is provided to permit the transfer of digitized analog input data from A/D converter 280 to AT bus 210. Signals from start/stop switch 10, trigger switch 70, and the external trigger input present on one pair of banana jacks IS0 pass from data converter card 230 onto AT bus 210 as interrupt requests to the PIC on the motherboard.

Figure 4A:
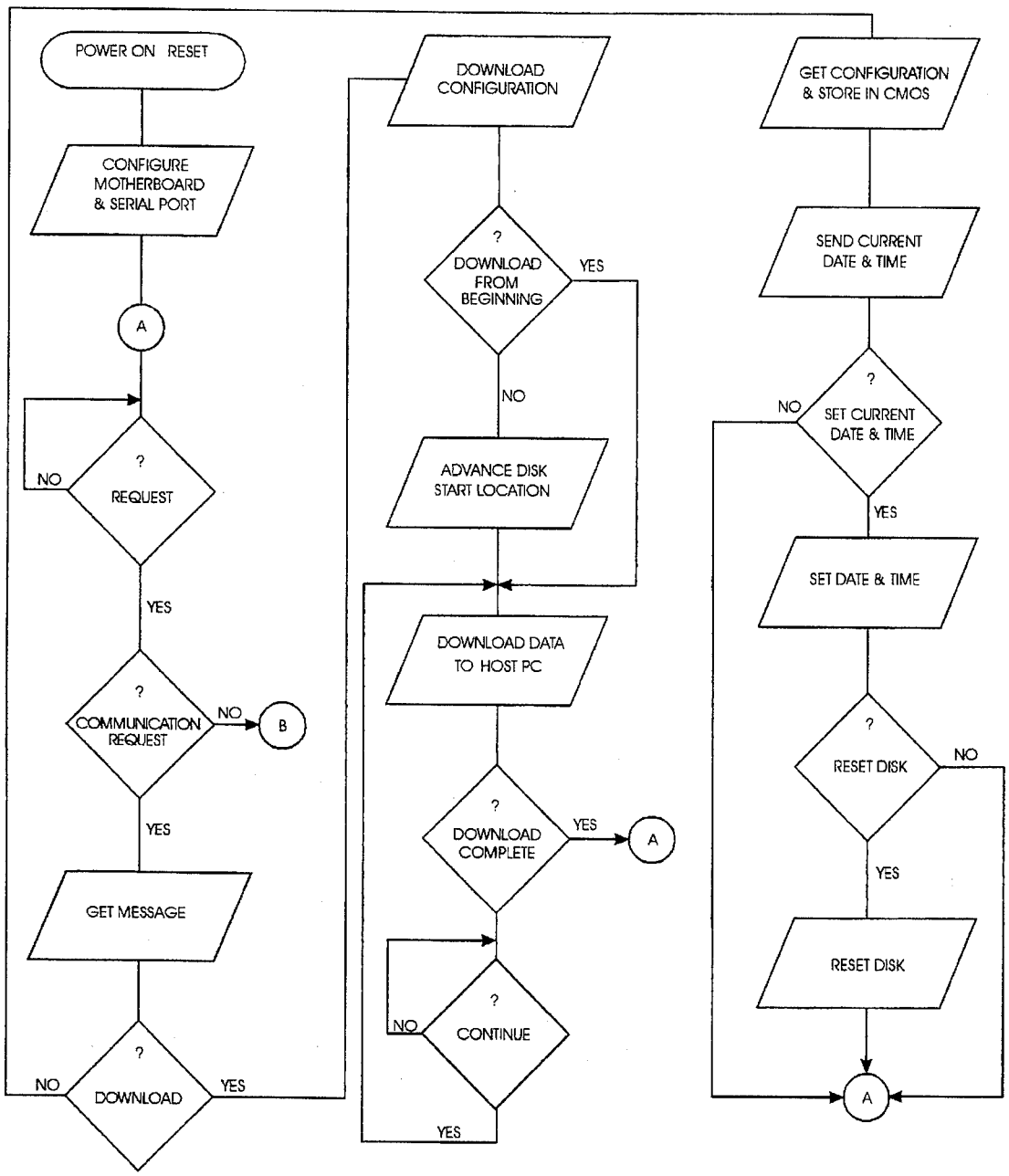
FIGS. 4A and 4B are flow charts of the firmware used in this invention.
Figure 4B:
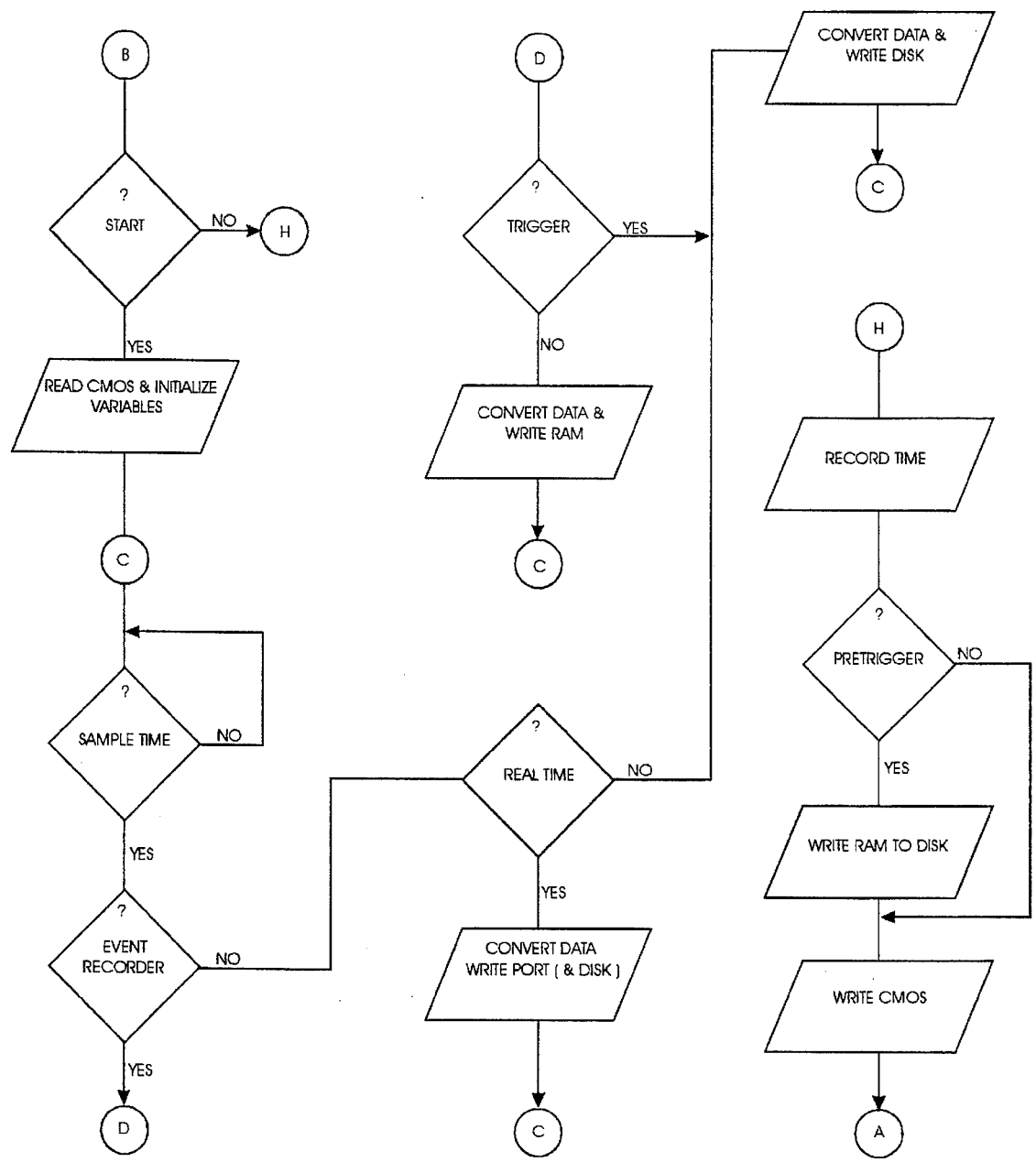

Referring now to FIGS. 4A and 4B which are flow charts of the ROM-resident firmware in the db8, following power on or reset the motherboard and serial port are configured according to standard practice, which is well known in the art. After the fixed disk reports all okay the db8 audibly signals it is ready to receive a request. The request is sensed on one of the interrupt request lines. If the request is a communications request the db8 checks to see if it is a valid download or configuration request. If it is a configuration request, the db8 receives configuration parameters and, if valid, stores them in CMOS memory. If not valid, the db8 sounds an error condition. At the completion of configuration the db8 sends the host PC its current date and time. If the user chooses to change the current date and time, the db8 updates the RTC to user specified values. If the user chooses to reset the fixed disk, the db8 changes the disk-current-location pointer in memory to its physical beginning. Operation returns to circle-A in FIG. 4A where the db8 waits for another request.

If a request has been received and it is not a communications request, then a jump is made to point B where it is determined if the request is a start request, If the request is a start request, the db8 reads configuration parameters from CMOS memory, initializes variables based on configuration parameters, establishes the disk starting location, and enables the on-board timer, which generates the sampling-rate base period. In the preferred embodiment the sampling-rate base period is one kilohertz. If the configured sample rate is one hundred hertz, the sample-time loop in FIG. 4B will have to count to ten before each acquisition sequence is initiated. Each time the sample-time loop goes true, the db8 proceeds to determine whether its configuration is for an event recorder, a real-time recorder, or a data logger. This is shown in FIG. 4B beginning with the event recorder inquiry following the sample-time loop. If the event recorder inquiry returns false, the db8 performs the real-time inquiry, If the real-time inquiry returns false, the configured mode of operation must be as a data logger.

If the db8 is configured as an event recorder, it checks for the occurrence of a trigger each acquisition sequence. Once a trigger has occurred, it no longer checks for the occurrence of a trigger. If a trigger has not occurred, the db8 sequentially converts analog inputs signals and stores them in RAM beginning with channel one. It continues this sequence of converting each analog input channel and writing its value as a plural-bit binary word to ram through the last enabled channel. When this sequence is complete, the db8 resumes operation at point C in FIG. 4B where it checks the sample-time loop to begin a new acquisition sequence.

When a trigger occurs the db8 reads the RTC, and stores the current date and time in CMOS as the uncorrected record beginning time. It sequentially converts analog input signals and stores them on the fixed disk beginning with channel one. The db8 continues this sequence of converting each analog input channel and writing its value as a plural-bit binary word to disk through the last enabled channel. When this sequence is complete, the db8 resumes operation at circle-C in FIG. 4B where it checks the sample-time loop to begin a new acquisistion sequence.

Following the second push of the start/stop switch the db8 terminates the above activity, jumps to letter H where records the time from the RTC to CMOS as the record ending time, stores the disk-ending-location pointer to CMOS, corrects the time recorded from the RTC when the trigger occured as record beginning time, writes pretrigger data to disk preceeding posttrigger data, and returns to circle-A in FIG. 4A.

RAM is treated as a ring buffer, in which, after its highest addressable storage location is used, its lowest addressable storage location is used. When a trigger occurs, a pointer to the last address used is saved in order to permit writing pretrigger data to disk immediately preceeding posttrigger data. The fixed disk is treated as a ring buffer, also. After its last available storage location is used, its first storage location is used.

A trigger can be the value of channel one exceeding a configured minimum or maximum value, a contact closure in some independent control circuit attached to the db8 at the external trigger input on its rear panel, or a push of the trigger switch on the db8 front panel. This selection is made during configuration.

If the configuration is for a data logger and not event recorder, the db8 sequentially converts analog input channels and writes them to disk beginning with channel one. The db8 continues this sequence of converting each analog input channel and writing its value as a plural-bit binary word to disk through the last enabled channel. When this sequence is complete the db8 resumes operation at circle-C in FIG. 4 where it checks the simple-time loop to begin a new sequence. The db8 continues the above activity in this manner until the start/stop switch is depressed to stop it. When this activity begins the db8 reads the current date and time from the RTC and writes this to CMOS as the record starting time. When this activity ends the db8 stores the disk-ending-location pointer to CMOS, and reads the current date and time from the RTC and writes this to CMOS as the record ending time.

If the configuration is for real-time data-acquisition, no data is written to disk or ram, but instead it is sent out the serial port to the host PC for display and analysis. In this activity, the db8 converts the analog value of channel one to a plural-bit binary word and sends it out the serial port. It sequentially converts subsequent channels and tramsmits their value as a plural-bit binary word to the host PC through the last enabled channel. When this sequence is complete the db8 resumes operation at circle-C in FIG. 4B where it checks the sample-time loop to begin a new acquisition sequence.

If the configuration is for real-time data-acquisition and recording, the db8 converts the analog value of channel one to a plural-bit binary word, writes it to disk, and sends it out the serial port to the host PC. The db8 writes data to disk for later retrieval by the host PC while simultaneously sending the same data to the host PC for real-time display and analysis. The db8 continues this sequence through the last enabled channel. When this sequence is complete the db8 resumes operation at circle-C in FIG. 4 where it checks the sample-time loop to begin a new acquisition sequence. In this mode of operation as in the data logger mode of operation, following the first push of the start/stop switch, the db8 stores in CMOS the record starting location on disk and the record starting time. Following the second push of the start/stop switch, the db8 stores in CMOS the record ending location on disk and the record ending time.

If the communications request to the db8 is a download request, the db8 downloads its current configuration including the number of channels enabled, individual channel spans, recording frequency, record starting date and time, and record ending date and time. If the user wishes to begin downloading somewhere past the beginning of the record, the db8 establishes a new beginning for the record, from whence downloading commences. The db8 downloads channel data to the host PC until the host PC data buffer is full. If the record length is less than or equal to the size of the host PC data buffer, that is, the complete record was downloaded, the db8 returns to circle-A to await another request. If the record length is greater than the size of the host PC data buffer the db8 awaits a command to continue downloading the record, and continues in this manner until all channel data have been downloaded or the db8 is reset.

Figure 5:
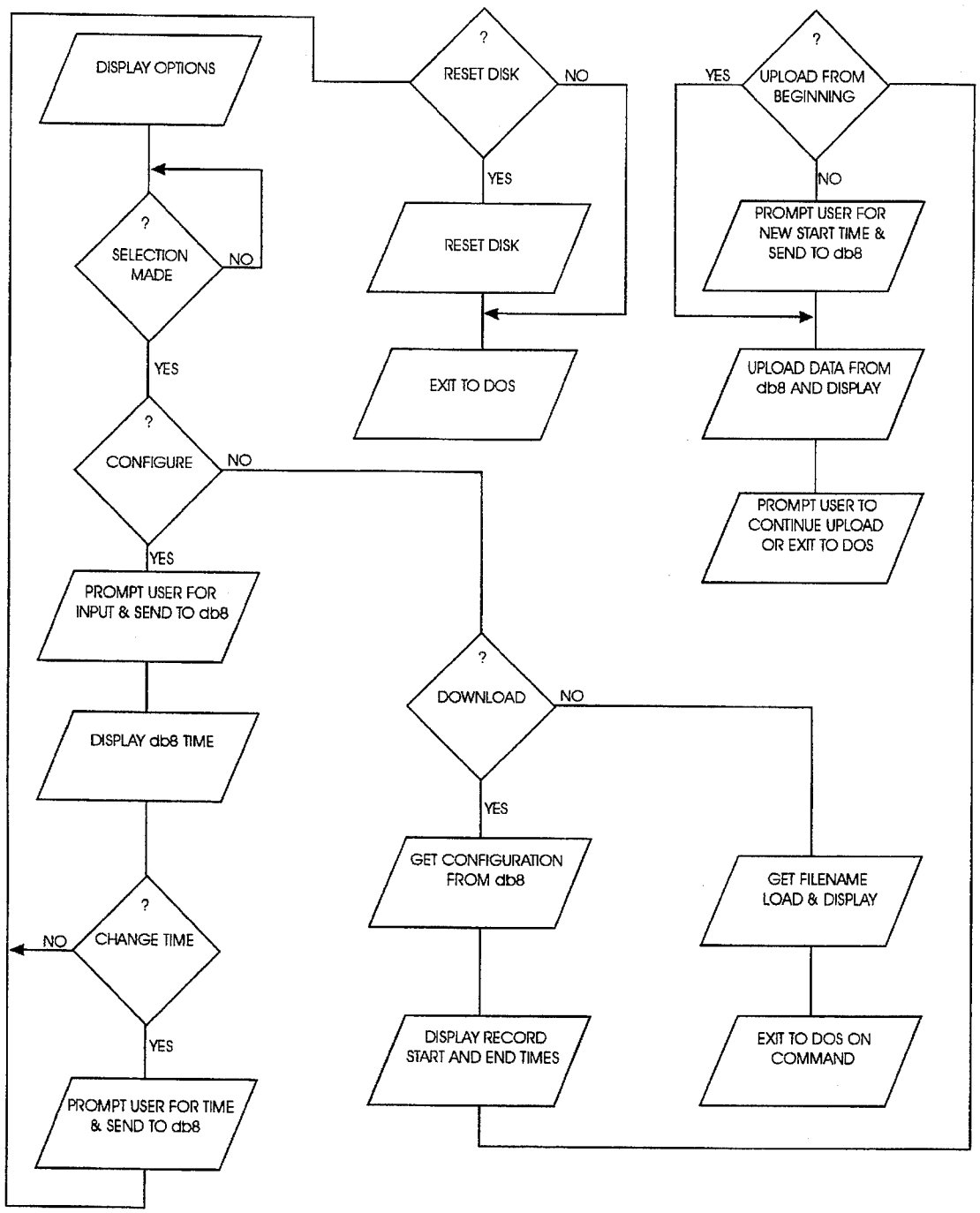
FIG. 5 is a flow chart of the software supplied with this invention for use in the host PC.

Referring now to FIG. 5 which is a flow chart of the supplied disk-based software for use in the host PC, the user may choose to configure the db8, upload the last record from the db8, or load a prerecorded data file from disk for display and analysis.

If he chooses to configure the db8 he is asked to choose configuration as a paperless recorder, event recorder, data-acquisition interface to his PC, or data-acquisition interface to his PC and paperless recorder. Parameters included in the configuration are:

System sample rate—in the preferred embodiment from one sample per second to one-thousand samples per second;

Number of channels enabled—from one to eight channels enabled;

Individual channel spans—0–1 V, 0–5 V, 4–20 mA;

Type of trigger if event recorder—the value of channel one exceeding a maximum value, the value of channel one exceeding a minimum value; the value of channel one exceeding a maximum or minimum value, or a contact closure from either the front-panel-mounted trigger switch or some external control circuit sensed at the rear-panel external trigger input. If the user chooses to trigger on the value of channel one, he is prompted for the value of the trigger as a percent of full scale.

Configuration parameters are sent out the PC's serial port to the dbS. The db8 reads the current date and time from the RTC and sends them out the serial port to the host PC. If the user chooses to update its current date and time he is prompted for new values, which are then sent to the db8.

If he chooses to upload the last record, the db8 sends the host PC the last record's beginning and ending times. If the user wishes to begin the download sometime past the beginning he is prompted for a new starting time. The displacement from the original beginning of the record is calculated and sent to the db8 to establish the new starting location for the desired new starting time. Download commences here. After the upload is complete—the host PC's data buffer is full—data transfer ceases, and the host PC displays the first display screen of converted channel data. The user can page forward and backward through the record, scroll a cursor to the right or left. He can save any part of the host PC's data buffer contents to disk, and he can screen dump any display screen to his attached printer. When he reaches the end of the PC's data buffer he is prompted to upload another buffer of data from the recorder if not all the record has been uploaded. He can choose to continue uploading data or not.

If he chooses to load a data file from disk for display and analysis he is prompted for the file name. The file is loaded into the PC's data buffer, then the first display screen is displayed. Paging, scrolling, screen dumping to an attached printer, and saving to file any part of the PC's data buffer are permitted in this mode, also.

Figure 6:
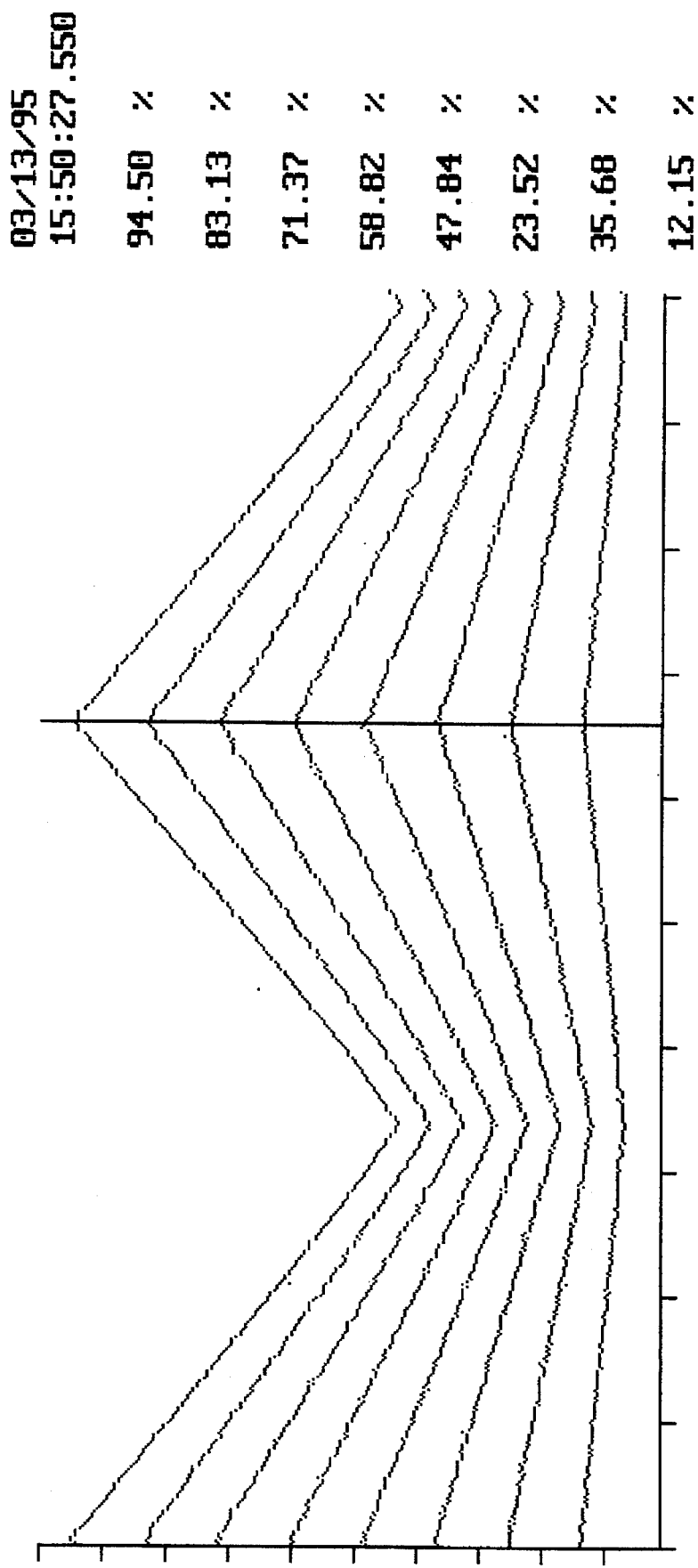
FIG. 6 is a screen dump of display data to a monochrome printer.
Figure 7:
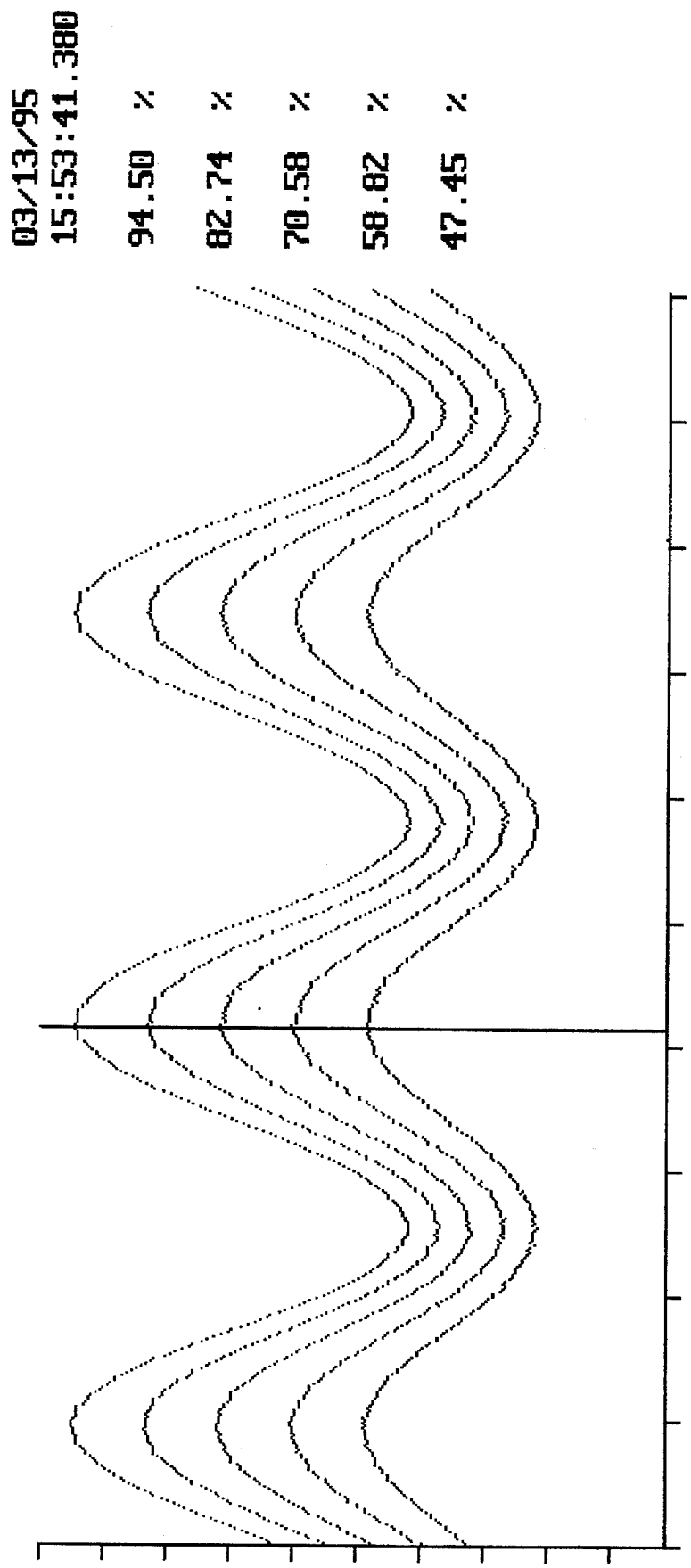
FIG. 7 is a screen dump of display data to a monochrome printer.

In FIG. 6, a three-Hertz triangle wave from a signal generator is divided across a resistor network to provide unique input to eight enabled channels. The value of each channel at the present cursor location, which is located near the middle of the figure in this instance, is displayed at the right margin together with the time when these eight data were recorded. In FIG. 7 a six-Hertz sine wave from a signal generator is divided across a resistor network to provide unique input to five enabled channels.

The screen display for the real-time data-acquisition operating modes is very similar to that for the display screen used in the non-real-time mode, which is shown in FIGS. 6 & 7. In the real-time modes, data are continually scrolled from right to left across the screen. The most recent data are written to the right boundary of the screen, the data they replace are immediately to the left of them. It can be seen data are eventually scrolled to the left boundary of the screen, beyond which they are discarded. The displayed value of channel data is taken to occur at the vertical axis, which is now on the right boundary of the screen, and the time and date displayed are taken from the host PC's real-time-clock.

Summary, Ramifications, and Scope

In the preferred embodiment the fixed disk has at least 250 megabyte capacity, and digital data representing analog input signals is eight bits or one byte long. With all eight input channels enabled at one-thousand samples per second, this provides at least thirty-one thousand two-hundred and fifty seconds or eight hours and forty minutes of recording time. If only four channels were enabled, recording time would be doubled at this sampling frequency to over seventeen hours. Likewise, if the sample rate were reduced from one-thousand samples per second to ten samples per second, an eight-channel record could go on for eight-hundred and sixty-eight hours or about one month and one week. A typical situation requiring a high sample rate is a jet-engine governor exhibiting intermittent instability, causing the engine to drop or pick up load suddenly and briefly. In this situation many variables must be monitored to determine which is causing the unstable operation. Here a record of five or ten minutes may be adequate to pin-point the problem. Another situation requiring a high sample rate might be the unsatisfactory performance of a complex load-share/load-shed scheme, in which the load demand of a facility, following a sudden interruption of the normal utility supply, needs to be shared by several motor-generator units, and load demand in excess of these units' combined capacity is shed by tripping non-critical load offline. This event may go on for fifteen or twenty minutes while the governors of the individual engines try to reach some equilibrium. A typical situation requiring a low sample rate is the variation in pH of a scrubbing liquor solution in a foul odor scrubber over a forty-eight hour period as load on the scrubber varies. Here information gained could be used to optimize a chemical addition schedule for the scrubber.

Accordingly, the reader will see that the data-acquisition system of this invention is useful in a variety of applications, is easily configured from the host PC, clearly identifies each displayed analog input, both graphically and numerically by assigning each input a unique color on the host PC's display monitor, is constructed from readily available, relatively inexpensive subassemblies, functions as a stand-alone data logger and event recorder, or as a peripheral attachment to a PC; provides the user with the option to screen dump any display screen to a printer attached to the host PC, and to copy any part of the record in the host PC's data buffer to disk for later viewing and analysis.

Recently Apple Computer compatible products have become available. As the availability of these compatible products increases and their price decreases, it may become advantageous to construct this invention from them. Card PCs are becoming affordable and could likewise be used in this invention in place of the motherboard and serial port/ IDE interface card. A new technology offering great promise for a light-weight application such as the db8 is the PCMCIA (Personal Computer Memory Card International Association) memory card port. Removable fixed disk drives are currently available, and notebook PCs are provided with PCMCIA ports to utilize these removable drives as well as other removable attachments. When the majority of PCs in use have these PCMCIA ports it may be advantageous to replace the db8 permanent fixed disk with a removable fixed disk, which can be inserted into a PCMCIA port in the host PC to accelerate data transfer rates to the host. Additionally, this invention could be configured to a user's unique requirements, wherein it is supplied with a PCMCIA port, removable fixed disk, and a PCMCIA port attachment for the user's PC to accept a removable memory card fixed disk. Another technology possibly suited to future use in the data-acquisition system of this invention is solid state, non-volatile memory (commonly referred to as flash ram) which is also available in PCMCIA memory card form. Presently this technology is relatively expensive, but is bound to become competitive in the future, and could be provided presently with the present invention to a user with this need. The software provided for the host PC could be provided for Apple Computer's PCs, Sun Microsystems' workstations, and computers utilizing operating systems other than DOS.

The data converter card of my design used in this invention has no provision for thermocouple or resistance-temperature device (RTD) inputs. The perceived lack of need for this optional capability among potential users of my invention precluded its inclusion. However, the card could be modified to include circuitry for these inputs if the need were there.

This is the first time, I believe, an IBM or IBM-compatible motherboard has been converted to an embedded controller. An embedded controller, with additional I/O circuitry, could be useful in a variety of applications. It could be used as a motor speed controller, with the addition of an analog output to modulate the on-time and frequency of silicon controlled rectifiers. It could be used as a complete process or machine control system, with additional I/O circuitry to perform analog output, digital input and output; the man-machine-interface exists already in the form of a host PC.

Thus the scope of the invention should be determined by the appended claims and their legal equivalents, rather than by the examples given.

I claim:

1. A remotely configurable data-acquisition system operating both independently of and dependent upon a remote computer comprising:

a programmable controller comprising:
program execution means;
digital memory means for temporary storage of digitized analog data from a plurality of inputs;

digital memory means for permanent storage of digitized analog data from a plurality of inputs;

digital memory means for permanent program storage;

a software program stored in said permanent program storage means;

communication means for the receipt of commands and configuration parameters from a remote computer, end for the transmission of digitized and recorded analog data and record pertinent data to said remote computer;

power supply means;

data converter means to convert a plurality of analog input signals to digital data;

means responsive to digital input signals to start data-acquisition, and to signal the occurrence of a triggering event;

software means executed in said remote computer to permit said remote computer to:

configure said programmable controller;

accept digitized and recorded analog input data from said programmable controller;

display digitized and recorded analog Input date on said remote computer's display console;

copy any part of data in said remote computer's data buffer to said remote computer's disk drives;

print the current display screen to said remote computer's attached printer.

2. A remotely configurable data-acquisition system operating both independently of and dependent upon a remote computer comprising:

a programmmable controller comprising:

a compatible motherboard in which the supplied read-only-memory firmware has been replaced by the firmware of this present invention;

a compatible integrated-drive-electronics interface and serial port card;

compatible integrated-drive-electronics fixed disk;

a compatible triple output power supply;

data converter means to convert a plurality of analog input signals to digital data;

means responsive to digital input signals start data-aquisition, and to signal the occurrence of a triggering event;

software means for execution in said remote computer to permit said remote computer to:

configure said data-acqusition system;

accept digitized and recorded analog input data from said data-acquisition system;

display digitized and recorded analog input date from said data-acquisition system on said remote computer's display console;

copy any part of said remote computer's data buffer to said remote computer's disk drives;

print said remote computer's current display screen to said remote computers attached printer.

* * * * *